(12) United States Patent
Abu-Isa et al.

(10) Patent No.: US 6,184,269 B1
(45) Date of Patent: Feb. 6, 2001

(54) MOLDABLE INTUMESCENT MATERIALS CONTAINING NOVEL SILICONE ELASTOMERS

(75) Inventors: Ismat Ali Abu-Isa, Rochester Hills, MI (US); Huide D. Zhu, Ridgefield, CT (US)

(73) Assignees: General Motors Corporation, Detroit; Delphi Technologies Inc., Troy, both of MI (US)

( * ) Notice: Under 35 U.S.C. 154(b), the term of this patent shall be extended for 0 days.

(21) Appl. No.: 09/345,370

(22) Filed: Jul. 1, 1999

(51) Int. Cl.[7] .................................................. C08K 5/02
(52) U.S. Cl. .................... 523/179; 524/415; 524/416; 524/436; 524/417; 524/377
(58) Field of Search ................... 523/179; 524/415, 524/416, 436, 437

(56) References Cited

U.S. PATENT DOCUMENTS

| | | | |
|---|---|---|---|
| 4,331,733 | 5/1982 | Evans et al. | 428/379 |
| 4,463,118 | 7/1984 | Evans et al. | 524/264 |
| 4,778,871 | 10/1988 | Newhouse et al. | 528/18 |
| 5,834,535 | 11/1998 | Abu-Isa et al. | 523/179 |

OTHER PUBLICATIONS

Rhein et al. "Method for Making Silarylene–Siloxane Polymers," U.S. Statutory Invention Registration H1612, published Nov. 5, 1996.

*Primary Examiner*—Veronica P. Hoke
(74) *Attorney, Agent, or Firm*—George A. Brown

(57) ABSTRACT

Moldable intumescent thermoplastic elastomer materials are disclosed based on suitable proportions of polyethylene, chlorinated polyethylene and a silicone elastomer with silphenylene siloxane monomer moieties and stabilizers, all with foamers, char formers and fillers. Examples of suitable silphenylene-siloxane monomer moieties are 1,4-phenylene-hexamethyltrisiloxanyl and 1,4-phenylene-1,1,3,5,5-pentamethyl-3-vinyltrisiloxanyl where the respective methyl groups may be replaced with suitable phenyl groups or other lower alkyl groups and their fluorinated analogs.

10 Claims, No Drawings

MOLDABLE INTUMESCENT MATERIALS CONTAINING NOVEL SILICONE ELASTOMERS

TECHNICAL FIELD

This invention pertains to moldable, polyethylene-based intumescent flame retardant materials (PE FRIMs). More specifically, this invention pertains to such moldable, thermoplastic elastomer, intumescent compositions containing high density polyethylene, chlorinated polyethylene and a relatively small amount of a relatively high molecular weight silphenylene siloxane elastomer.

BACKGROUND OF THE INVENTION

U.S. Pat. No. 5,834,535 describes a family of compositions in accordance with its title, "Moldable Intumescent Polyethylene and Chlorinated Polyethylene Compositions." These compositions are readily moldable by a variety of polymer molding practices into articles that have good physical strength. Moreover, the molded bodies have an additional property of serving as a heat and fire barrier. Upon exposure to a flame, they initially burn but do not melt and drip. Instead, they form a relatively strong foamed barrier of carbonized char and inorganic ceramic-like material. In some embodiments of these high density polyethylene (HDPE) and chlorinated polyethylene (CPE) compositions, a silicone elastomer (specifically, an organosiloxane) is used in addition to, or as a replacement for, some of the CPE. In many formulations the siloxane polymer improved the processibility of the material by reducing the mixing torque requirement. Further, in the molded product the polysiloxane reduced smoke evolution.

It is an object of this invention to provide a family of polyethylene and chlorinated polyethylene-based intumescent flame retardant materials containing silphenylene-siloxane elastomers for improved intumescence properties and improved processing properties.

SUMMARY OF THE INVENTION

In accordance with this invention, certain high molecular weight silphenylene siloxane elastomers are used in combination with thermoplastic high density polyethylene, chlorinated polyethylene elastomer and suitable specified additives to form moldable blends that yield intumescent molded products. Such molded mixtures of HDPE, CPE and silphenylene siloxane elastomer form a thermoplastic elastomer that has high temperature resistance and produces a good foamed char barrier with little smoke when exposed to a flame and burned.

Thermoplastic elastomers are a family of materials that have the properties of elastomers but can be processed as plastics. Being elastomeric, they have the desirable properties of flexibility, impact resistance, energy and shock absorption, and sound and vibration reduction. They can be formed by compression molding, injection molding, extrusion, vacuum forming and blow molding. Thermoplastic elastomers are recyclable, and in plant scrap generated during processing can be chopped up and used again to make parts. If such material can be made intumescent, then a convenient form of fire protection is available that can be introduced in vehicles on the assembly line.

The present invention teaches intumescent thermoplastic elastomer compositions that can be molded into automotive parts. The moldings are very effective as a heat and fire barrier. Upon burning, these materials will not melt and drip but will form a relatively strong foamed barrier of char and inorganic ceramic-like material. The intumescent material could be used to replace existing plastic parts in cars or as a cover or shield to protect other plastic parts. The material is based on high density polyethylene as the hard phase of thermoplastic elastomer and chlorinated polyethylene and a specified silphenylene siloxane silicone rubber as the soft phase. Properties of compression molded and injection molded parts will be presented.

Moreover, moldings produced from the compositions suitably have at least certain minimal physical properties such as a tensile strength (for injection moldings) of 0.5 MPa (72 psi) and an elongation at break of at least six percent at normal room temperature (ASTM D412). Such properties give moldings sufficient strength and durability so as to be useful in architectural applications, automotive applications, marine applications or the like. In addition to being formable and having useful physical properties for such applications, the moldings also have "intumescence efficiency." When exposed to elevated temperatures, the intumescent additives react or decompose to convert the molded plastic body to a residual insulating foam-like structure that is resistant to burning and insulates the back side of the molding from the high temperatures of the combustion flame.

Suitable constituents of the subject intumescent thermoplastic elastomer molding compositions comprise:

1. Resin Matrix

A high density polyethylene resin is mixed with a chlorinated polyethylene elastomer and silphenylene siloxane elastomer in proportion to obtain desired physical properties in a molded part. Suitable examples of HDPE and CPE are, of course, well known. However, the selection of the subject silicone constituent requires some explanation.

Silphenylene siloxane elastomeric polymers based, for example, on 1,4-phenylene-hexamethyltrisiloxanyl monomer or 1,4-phenylene-1,1,3,5,5-pentamethyl-3-vinyltrisiloxanyl monomer are suitable provided that the polymers are of sufficient molecular weight to provide the desired physical and intumescence properties to the molded composition. For example, Mn (i.e., number average molecular weight) values of 64,000 for poly(1,4-phenylene-hexamethyltrisiloxanyl) and of 109,000 for poly(1,4-phenylene-1,1,3,5,5-pentamethyl-3-vinyltrisiloxanyl) yield suitable elastomers. A further characteristic of the subject silicones is that each monomer moiety contains a silphenyl and a siloxane group. The silphenyl group has two silicon atoms that in the above examples each have two attached methyl groups. One of these methyl groups can be replaced with a phenyl group. Any of the four methyl groups can be replaced with another alkyl group such as ethyl, propyl, isopropyl group or fluorinated analogs of these groups. As illustrated, the siloxane group has a single silicon atom with two methyl groups or a methyl group and a vinyl group. The methyl groups on the siloxane portion of the monomer can be replaced with other alkyl groups such as ethyl, propyl, isopropyl group or fluorinated analogs of these groups. One of the siloxane methyl groups can also be replaced with a phenyl group.

A liquid chlorowax (e.g., Paroil 145) is suitably used as a plasticizer when needed to impart flexibility to the resin matrix at low temperatures.

2. Thermal and Oxidation Stabilizers

Although any suitably compatible stabilizer can be used with HDPE, CPE and the subject silicone for protection against heat and oxygen, it is found that a system consisting of distearylthiodipropionate (DSTDP) and a butylated reaction product of p-cresol and dicyclopentadiene (Wingstay L) is very effective as an antioxidant. In addition to such antioxidant, MgO is used in the formulation to absorb evolved HCL produced during aging of chlorinated polyethylene and thus acts as an effective dehydrochlorination stabilizer.

3. Gas-Generating Foaming Agents

These agents are used in the subject compositions to generate gases in order to foam the polymeric matrix before it is consumed by the fire. The residue that remains after burning of most organic material will have a porous char structure and will thus be an effective thermal barrier. Two preferred gas-generating agents used in this invention are ammonium dihydrogen phosphate, $NH_4H_2PO_4$, and ammonium polyphosphate, approx. $(NH_4PO_3)_n$, which emit ammonia when heated. Hydrated alumina and hydrated magnesia are also preferred because they emit water vapor when heated. The ammonium dihydrogen phosphate will also form phosphoric acid which will act as a catalyst to encourage char formation from polyhydroxy compounds.

4. Char Formers

Any suitable compatible starch or other carbohydrate may be used in the moldable compositions to form heavy char when exposed to fire. Polyhydric alcohols also perform the same function. A preferred char former is monopentaerythritol or dipentaerythritol.

5. In appropriate formulations, other ingredients are beneficially added to intumescent moldable material. A first is a filler consisting of glass fibers, mica particles and/or titanium oxide powder. These fillers help strengthen the molding and develop a strong structure of the material after intumescing. A second ingredient is antimony oxide which imparts fire retardancy to the intumescent material and hence slows down the burning process. This is helpful in decreasing heat release rate during fire and increasing the char content.

Further objects and advantages of the invention will be more apparent from a detailed description thereof which follows.

DESCRIPTION OF PREFERRED EMBODIMENTS

This invention provides intumescent thermoplastic molding compositions that can be blow molded, injection molded, compression molded or otherwise suitably molded and shaped to a desired geometry or configuration by thermal processes. In some applications, the molded part may be intended to serve primarily as a heat or fire barrier. More often, it will also serve another functional purpose and serve incidentally as a heat or fire barrier. In either case, the invention provides a moldable material mixture that can be formed into a molded product in a suitable manufacturing facility and transported for efficient handling at an automobile assembly line or at a construction site or the like. Thus, the subject composition facilitates efficient manufacture and assembly and provides robust physical and fire-resistant properties in use.

Table 1 illustrates both a specific preferred moldable intumescent composition and suitable ranges of the respective ingredients for a series of compositions in which a suitable high density polyethylene, a suitable chlorinated polyethylene and a silphenylene siloxane elastomer are used together to form thermoplastic elastomer-based compositions of this invention. The values in Table 1 opposite each illustrative ingredient are percentage by weight, and the numbers for each moldable composition mixture total to 100%.

TABLE 1

Intumescent Material Formulations

| Ingredient | A Preferred Concentration (% by weight) | Suitable Range (% by weight) |
| --- | --- | --- |
| High Density Polyethylene (Paxon 4261A) | 23 | 15–25 |
| Chlorinated Polyethylene (Dow Chemical 3615P) | 30 | 27–33 |
| Silphenylene Siloxane Elastomer (as further specified below) | 2 | 2–20 |
| Chlorowax (Dover Chemical, Paroil 145) | 7 | 5–10 |
| Ammonium Dihydrogen Phosphate (Monsanto Phoscheck P/30) | 8 | 7–16 |
| Hydrated Magnesium Oxide (Magshield 98, fine) | 16 | 9–17 |
| Distearylthiodipropionate (Argus/Witco DSTDP antioxidant) | 0.5 | 0.5–5 |
| Hindered Phenol (R. T. Vanderbilt Wingstay L antioxidant) | 0.5 | 0.5–5 |
| Mica 200PP | 6 | 5–10 |
| Antimony Oxide (Harwick Chemical Fireshield H) | 2 | 0–5 |
| Pentaerythritol, Mono & Di (Perstorp) | 5 | 3–10 |

The polyethylene constituent of the subject compositions has a density in the range of 0.940 to 0.970 g/cm$^3$. Such materials are produced using suitable known catalysts at a relatively low pressure of ethylene. Such high density polyethylenes are available with molecular weight ranging from about 10,000 (usually waxes) to ultra high molecular weight HDPE (UHMW-HDPE) of several millions. Wide variation of branching and density are also available.

Many grades of high density polyethylene (HDPE) can be used in this invention depending on the application and the method of processing. High molecular weight/high melt viscosity grades are used for blow molding applications. Low melt viscosity grades are preferred for injection molding. Extrusion is normally performed using intermediate melt viscosities.

Chlorinated polyethylene (CPE), suitably with about 36% to 42% by weight chlorine, is preferably combined with HDPE and the subject silphenylene siloxane elastomer in accordance with the invention in the above proportions to produce suitable moldable intumescent thermoplastic elastomer grades with varying degrees of hardness.

The specification of suitable silphenylene siloxane elastomers and the synthesis of exemplary elastomers is provided in detail below in this specification.

Chlorowax is used to improve low temperature properties of the intumescent polyethylene/chlorinated polyethylene/ silicone thermoplastic elastomer mixture. An added advantage of chlorowax is that it contributes to the char formation during burning of the intumescent material.

The presence of ammonium dihydrogen phosphate (or ammonium polyphosphate) promotes char formation, leads to a strong structure of the intumescent material structure after burning, and helps in the intumescence process by emitting ammonia gas during burning.

Both hydrated alumina and hydrated magnesia emit water vapor during burning, and they act to induce intumescence and cool down the fire. In addition, magnesium oxide acts as a dehydrochlorination stabilizer.

Pentaerythritol as monomolecular and/or bimolecular forms is a very effective char former.

Both the thio-based (DSTDP) and the hindered phenol (Wingstay L) antioxidants are effective in stabilizing the intumescent material against thermal oxidation, especially if used together as co-synergists.

Mica reinforcing filler leads to increased strength in the structure of the intumescent material after burning. Its presence at 3% or higher in the formulation is needed in some formulations to prevent the intumesced residue from being friable. Other fillers that can also provide strength to the residue are titanium dioxide and glass fibers.

Depending upon the composition and content of the silphenyl siloxane elastomer in the subject formulations, the presence of antimony oxide may be optional. When used, antimony oxide provides added flame retardancy to the formulation. Zinc borate can also be used to impart a similar effect.

Preparation of Silphenylene Siloxane Elastomers 1,4-bis (dimethylsilyl)benzene, bis-(dimethylamino)-dimethyl silane, bis(dimethylamino)-methylvinyl silane and bis (dimethylamino)-methylphenyl silane were obtained from United Chemical Technologies. The bis(dimethylamino) silanes were purified by using distillation under nitrogen atmosphere. All other reagents used were purified using standard purification methods.

Synthesis 1,4-Bis-(hydroxydimethylsilyl)benzene

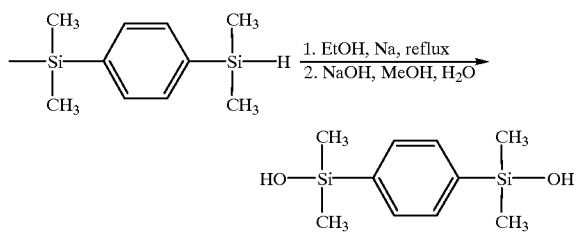

Into a flame dried 250 mL three neck round bottom flask equipped with magnetic stirrer and water condenser was added anhydrous ethanol (122 mL) and a small piece of sodium metal under argon. The ethanol was heated to reflux. Then, the 1,4-bis(dimethylsilyl)benzene (100 g, 51.5 mmol) was added dropwise to the reaction flask with stirring over 30 minutes. When hydrogen evolution ceased, the reaction mixture was added with vigorous stirring to a mixture of NaOH (69.45 g), CH$_3$OH (427 mL) and H$_2$O (48.8 mL). After standing for 15 min, another solution of NaOH (69.45 g) in H$_2$O (463.6 mL) was added to the mixture. The mixture was allowed to stand for 30 minutes with occasional shaking and then poured into a vigorously stirred solution of KH$_2$PO$_4$ (610 g) in excess ice and H$_2$O (2440 mL). Crude disilanol product was precipitated as a white solid, filtered, dissolved in ethyl ether (610 mL), and washed with an equal volume of water. The ether solution of the product was dried (anhydrous Na$_2$SO$_4$) and concentrated to give a white solid. The solid was recrystallized from hot CCl$_4$ (500 mL) and dried at 60° C. overnight in vacuo to provide final needle-like white solid product (90 g, yield 77.6%). $^1$H and $^{13}$C NMR analyses were consistent with the structure assigned.

Poly(1,4-phenylene-hexamethyltrisiloxanyl), E1

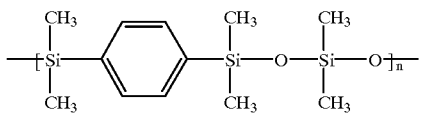

Into a flame dried 250 mL three neck round bottom flask equipped with mechanical stirrer was added under nitrogen 1,4-Bis(hydroxydimethylsilyl)benzene (30 g, 132.7 mmol). Then, dry toluene (45 mL) was transferred into the flask by syringe. While stirring, bis-(dimethylamino)-dimethylsilane (22 mL, d=0.809 g/mL, 121.9 mmol) was transferred by syringe into the reaction flask. The flask was heated to 105° C. to 110° C. and the evolution of dimethylamine was noticed. After one hour reaction, an additional amount of bis-(dimethylamino)dimethylsilane (0.5 mL each time) was added at a time interval of 30 minutes until there was no significant gas evolution and the reaction mixture gelled. Then, the reaction mixture was precipitated into methanol (100 mL). A transparent gum-like elastomer (35 g, yield 92%) was obtained after drying in vacuum oven at 70° C. for 8 hours. $^1$H and $^{13}$C NMR analyses were consistent with the structure assigned.

Poly(1,4-phenylene-1,1,3,5,5-pentamethyl-3-vinyltrisiloxanyl), E2

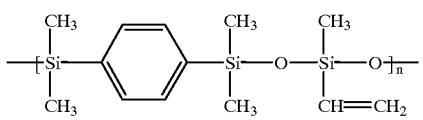

Into a flame dried 250 mL three neck round bottom flask equipped with mechanical stirrer was added under nitrogen 1,4-bis (hydroxydimethylsilyl)benzene (30 g, 132.7 mmol). Then dry toluene (45 mL) was transferred into the flask by syringe. While stirring, bis(dimethylamino) methylvinylsilane (23 mL, d=0.822 g/mL, 119.7 mmol) was syringe transferred into the reaction flask. The flask was heated to 105° C. to 110° C. and the evolution of dimethylamine was noted. After one hour reaction, an additional amount of bis(dimethylamino)methylvinylsilane (0.5 mL each time) was added at a time interval of 30 minutes until there was no significant gas evolution and the reaction mixture gelled. The reaction mixture was precipitated into methanol (100 mL). A transparent gum-like material (34 g, yield 87%) was obtained after drying in vacuum oven at 70° C. for 8 hours. $^1$H and $^{13}$C NMR analyses were consistent with the structure assigned.

Molecular weight data on the E1 and E2 silicone elastomers was obtained by gel permeation chromatography. The measurements were conducted by dissolving the respective polymer in chloroform at a concentration level of 2% by weight. The temperature of the column was set at 40° C. Two hundred micrograms of solution were injected onto Polymer Laboratories gel permeation columns (PS 5μ). The E1 polymer, poly(1,4-phenylene-hexamthyltrisiloxanyl) had a Mn of 64,000 and a Mw of 150,000 for a polydispersity ratio of 2.3. The E2 polymer, poly(1,4-phenylene-1,1,3,5,5-pentamethyl-3-vinyltrisiloxanyl) had a Mn of 109,000 and a Mw of 480,000 (PDI=4.4).

Silphenylene siloxane elastomers have been synthesized previously using the chlorosilane or the ureidosilane routes. The chlorosilane-silanol condensation reaction will generate HCl which can catalyze the self-condensation of the silanol monomer, thus preventing the formation of exactly alternating polymer structures. Although the ureidosilane approach can produce alternating silphenylene siloxane elastomers, the reaction times are very long and broad molecular weight distributions are common. For these reasons, it is preferred to use the disilanol diaminosilane polycondensation route in which the byproduct amine is generated as a gas providing a clean reaction. The reaction was carried out in toluene at 110° C. under nitrogen atmosphere. By careful purification of the starting monomers, either by distillation or recrystallization, all elastomers were obtained as transparent, high molecular weight, gum-like materials with high yields. The results from $^1$H and $^{13}$C NMR characterization are consistent with the structures of silphenylene siloxane elastomers.

DSC and TGA Characterization of Pure Silphenylene Siloxane Elastomers

Table 2 gives the differential scanning calorimetric (DSC) data for the E1 and E2 elastomers. These materials have very low glass transition temperatures indicating good elastomeric properties.

TABLE 2

DSC Data for E1 and E2 at a Heating Rate of 20° C./min Nitrogen

| Samples | Glass transition temperature, ° C. |
|---|---|
| E1 | −55.4 |
| E2 | −60.5 |

Table 3 gives the thermogravimetric analysis (TGA) data in air for E1 and E2. E2 had 77.7% residue at 900° C. while E1 had 33.4% residue. Multistep degradation was observed for E1 in air atmosphere.

TABLE 3

TGA Data for E1 and E2 at a Heating Rate of 50° C./min in Air

| Samples | Onset temperature for decomposition, ° C. | Peak temperatures for decomposition, ° C. | Residues left at 900° C., % |
|---|---|---|---|
| E1 | 377 | 502, 528, 656 | 33.4 |
| E2 | 326 | 567 | 77.7 |

Table 4 shows the TGA results for E1 and E2 in nitrogen. One step degradation was noted for both E1 and E2. E2 again had a higher residue amount than E1 did. At 900° C., E2 had a residue of 59.8%.

TABLE 4

TGA Data for E1 and E2 at a Heating Rate of 50° C./min in Nitrogen

| Samples | Onset temperature for decomposition, ° C. | Peak temperatures for decomposition, ° C. | Residues left at 900° C. % |
|---|---|---|---|
| E1 | 419 | 493 | 21.8 |
| E2 | 521 | 550 | 59.8 |

Elemental analysis was also carried out for the E1 and E2 residues from nitrogen atmosphere. It is noted that the E2 residue had lower carbon content that E1 residue. This could be due to the higher concentration of silicon in the E2 residue.

Mixing of the Molded Intumescent Thermoplastic Elastomer Compositions

The mixing of polyethylene-based flame retardant intumescent material (PE FRIMs) described herein on a laboratory scale was achieved by different methods including mixing on a two-roll mill heated to 65° C. The polymeric resins and the stabilizers were added to the rolls and shear mixed for about five minutes. At that time good mixing was visually observed and the material was banded on one of the rolls. The actual temperature of the resin during mixing approached 150° C. due to shearing of the mixture. The ingredients for intumescence were added next. They were added in a fine powder form and mixed well with the resin. The mica flakes were then added and mixed into the formulation for about three minutes. The total mixing time of each compound was about 15 minutes.

Table 5 gives the compositions (parts of weight) for the PE FRIMs. The PE FRIMs were processed using an extruder equipped with a rod die. The temperature profile for extrusion was 270° F., 310° F., 310° F. and 310° F. for zones 1, 2, 3 and die, respectively. Injection molding was used for preparing tensile, tear and Izod impact samples. The temperature profile for injection was 300° F., 330° F., 360° F. and 200° F. for rear zone, front zone, nozzle and mold, respectively.

TABLE 5

Formulations of Polyethylene FRIMs

| Ingredients | IPE22 | IPE24 | IPE25 |
|---|---|---|---|
| HDPE Paxson 4261 | 23 | 23 | 23 |
| CPE 3615 (Chlorinated PB) | 30 | 30 | 30 |
| Paroil 145 (Chlorowax) | 7 | 7 | 7 |
| Phoschek P/30 (Ammonium Polyphosphate) | 8 | 8 | 8 |
| Magshield 98, fine | 16 | 16 | 16 |
| DSTDP (Antioxidant) | 0.5 | 0.5 | 0.5 |
| Winstay L (Antioxidant) | 0.4 | 0.4 | 0.4 |
| Mica 200PP | 6 | 6 | 6 |
| Pentaerythritol (Char Former) | 5 | 5 | 5 |
| Dicup 40KE (Crosslinker) | 0.05 | 0.05 | 0.05 |
| TMPT (Crosslinker) | 0.05 | 0.05 | 0.05 |
| TiO2 | 2 | 2 | 2 |
| Silicone Powder, 4-7081 | 2 | | |
| E1, 100%DiMe | | 2 | |
| E2, 100%ViMe | | | 2 |

It is noted that the above three samples were formulated with only 2% by weight of the respective silicones and without antimony oxide. These examples were prepared as a severe test of the intumescence efficiency of these molded compositions. The prior intumescent formulations as disclosed in the '535 patent each contained more silicone and antimony oxide.

Characterization

The formulated PE-based intumescent materials were characterized by high resolution TGA and modulated DSC using TA instruments. The mechanical properties were measured using Instron testing equipment.

Burning Test

A square-shaped intumescent material sample (5×5×~0.15 inches) was mounted horizontally in a metal frame. The bottom face of the square sample was exposed to the Bunsen burner flame, and thermocouples were placed on the top surface of the sample at three locations: rear, center and front. The surface temperatures at these locations were recorded during the 30 minute burning test. The temperature recording time could be shorter than 30 minutes if the sample is burned through during the burning run. This practice pertaining to evaluating the Intumescence Efficiency of a molding is substantially the same as that disclosed in U.S. Pat. No. 5,834,535 in the section entitled "Intumescent Test Apparatus." That section and other portions of the '535 patent describing intumescence efficiency are hereby incorporated into this specification by reference.

Samples IPE22, IPE24 and IPE25 were prepared. The only difference between these samples is that different silicones were used in their formulations. IPE22 used a commercial polysiloxane silicone powder, IPE24 used silphenyl siloxane silicone E1, and IPE25 used silphenyl siloxane silicone E2. The center portions (i.e., the portions directly over the 1000° C. flame) of both the IPE22 and IPE24 compression moldings were burned through after about eight to ten minutes exposure. Remarkably, the IPE25 formula molding having silicone E2 survived during this 30 minute burn test and displayed a maximum temperature on its upper side (intumescence efficiency) of about 250° C.

DSC and TGA Characterization of PE FRIMs

IPE24 and IPE25 were characterized by MDSC. Table 6 shows the results. IPE24 and IPE25 have similar values for $\Delta H$ and heat capacity.

TABLE 6

DSC Results for PE FRIMs

| Samples | $\Delta H$, J/g | Heat Capacity at $T_m$, J/g ° C., ($T_m$, ° C.) |
|---|---|---|
| IPE24 | 18.7 | 4.18 (125) |
| IPE25 | 19.3 | 4.15 (125) |

Table 7 lists the TGA results for IPE22, IPE24 and IPE25 in air. Multistep degradation was noted. Both IPE24 and IPE25 had higher onset degradation than IPE22. The TGA residues range from 24% to 27.5%.

TABLE 7

TGA Data for PE FRIMs at a Heating Rate of in 50° C./min Air

| Samples | Onset temperature for decomposition, ° C. | Peak temperatures for decomposition, ° C. | Residues left at 900° C. % |
|---|---|---|---|
| IPE22 | 173 | 289, 452 | 24 |
| IPE24 | 202 | 301, 474, 522 | 27.5 |
| IPE25 | 207 | 298, 471, 512 | 27 |

Table 8 lists the TGA results for IPE22, IPE24 and IPE25 in nitrogen. Multistep degradation was also noted. Both IPE24 and IPE25 had higher onset degradation than IPE22. The TGA residues range from 24% to 29%.

TABLE 8

TGA Data for PB FRIMs at a Heating Rate of 50° C./min in Nitrogen

| Samples | Onset temperature for decomposition, ° C. | Peak temperatures for decomposition, ° C. | Residues left at 900° C. % |
|---|---|---|---|
| IPE22 | 179 | 302, 449 | 24 |
| IPE24 | 202 | 310, 462 | 29 |
| IPE25 | 184 | 311, 463 | 28 |

Mechanical Properties

Table 9 gives the tensile results for injection molded IPE22, IPE24 and IPE25. The stress ranges from 7.2 to 13.7 MPa. The strain ranges from 20.0 to 25.1%. All these injection samples have satisfactory tensile mechanical properties.

TABLE 9

Tensile Results for Injection Molded IPE22, IPE24–25

| Samples | IPE22 | IPE24 | IPE25 |
|---|---|---|---|
| Max. stress, MPa | 13.7 | 7.2 | 8.1 |
| Strain at break, % | 20.0 | 21.9 | 25.1 |

Table 10 gives the tensile results for compression molded IPE22, IPE24 and IPE25. The stress ranges from 3.1 to 4.0 MPa. The strain ranges from 123.7 to 152.2%. All these compression samples have satisfactory tensile mechanical properties.

TABLE 10

Tensile Results for Compression Molded IPE22, IPE24–25

| Samples | IPE22 | IPE24 | IPE25 |
|---|---|---|---|
| Max. stress, MPa | 4.0 | 3.1 | 3.7 |
| Strain at break, % | 144.3 | 152.2 | 123.7 |

Table 11 gives the tear results for injection molded IPE22, IPE24 and IPE25. The tear resistance ranges from 40.8 to 55.2 N/mm. All these injection samples have satisfactory tear mechanical properties.

TABLE 11

Tear Results for Injection Molded IPE22, IPE24–25

| Samples | IPE22 | IPE24 | IPE25 |
|---|---|---|---|
| Max. tear resistance, N/mm | 55.2 | 40.8 | 45.8 |

Table 12 gives the tear results for compression molded IPE22, IPE24 and IPE25. The tear resistance ranges from 31.7 to 44.2 N/mm. All these compression molded samples have satisfactory tear mechanical properties.

TABLE 12

Tear Results for Compression Molded IPE22, IPE24–25

| Samples | IPE22 | IPE24 | IPE25 |
|---|---|---|---|
| Max. tear resistance, N/mm | 44.2 | 31.7 | 32.8 |

It is found that suitable silphenylene siloxane elastomeric polymers based, for example, on 1,4-phenylene-hexamethyltrisiloxanyl monomer or 1,4-phenylene-1,1,3,5,5-pentamethyl-3-vinyltrisiloxanyl monomer provide useful intumescence properties to polyethylene and chlorinated polyethylene-based thermoplastic elastomer formulations as specified in Table 1. They also facilitate the processing of such formulations. Such polymers are characterized by average molecular weight values, Mw, in the range of about 30,000 to 800,000. They are true elastomers.

The elastomers E1, poly(1,4-phenylene-hexamethyltrisiloxanyl) and E2, poly(1,4-phenylene-1,1,3,5,5-pentamethyl-3-vinyltrisiloxanyl) with their respective Mw values of 150,000 for E1 and 480,000 for E2 represent preferred silicone elastomers for use in the subject PE FRIMs.

A further characteristic of the subject silicones is that each monomer moiety contains a silphenyl and a siloxane group. The silphenyl group is viewed as having two silicon atoms with four R groups attached. One R may be a phenyl group. Any or all of the Rs may be an alkyl group selected from the group consisting of methyl, ethyl, propyl, isopropyl or fluorinated analogs of these groups. The siloxane group has two R groups that were illustrated as either two methyl groups or as a methyl group and a vinyl group. The one or two methyl groups on the siloxane portion of the monomer can be replaced with one phenyl or other alkyl groups such as ethyl, propyl, isopropyl or fluorinated analogs of these groups.

What is claimed is:

1. An intumescent thermoplastic molding which is the molded product of a blended mixture initially comprising on the basis of 100 parts by weight blended mixture:
   15 to 25 parts high density polyethylene,
   27 to 33 parts chlorinated polyethylene,
   2 to 20 parts of a silicone elastomer consisting essentially of silphenylene-siloxane monomer moieties and having a value of Mw in the range of 30,000 to 800,000,
   5 to 10 parts chlorowax,
   7 to 16 parts of at least one of ammonium dihydrogen phosphate and ammonium polyphosphate,
   9 to 17 parts of at least one of hydrated aluminum oxide and hydrated magnesium oxide,
   3 to 10 parts of a char former selected from the group consisting of carbohydrates and polyhydric alcohols,
   0 to 5 parts antimony oxide,
   5 to 10 parts of a filler selected from the group consisting of glass fibers and mica particles, and
   an anti-oxidant for said polymeric composition.

2. An intumescent molding as recited in claim 1 in which said monomer moiety comprises 1,4-phenylene-hexa (R) trisiloxanyl, where R represents up to two phenyl groups, a vinyl group or methyl, ethyl, propyl, or isopropyl groups.

3. An intumescent molding as recited in claim 1 in which said monomer moiety comprises 1,4-phenylene-hexa (R) trisiloxanyl, where R represents up to two phenyl groups, a vinyl group or methyl, ethyl, propyl, or isopropyl groups or fluorinated analogs of such alkyl groups.

4. An intumescent molding as recited in claim 1 in which said monomer moiety comprises 1,4-phenylene-1,1,3,5,5-penta (R)-3 vinyl trisiloxanyl, where R represents up to two phenyl groups or methyl, ethyl, propyl, or isopropyl groups or fluorinated analogs of such alkyl groups.

5. An intumescent thermoplastic molding as recited in any of claims 1–4 comprising 2 to 5% by weight antimony oxide.

6. A moldable mixture for making an intumescent molding, said mixture comprising on the basis of a total of 100 parts by weight:
   15 to 25 parts high density polyethylene,
   27 to 33 parts chlorinated polyethylene,
   2 to 20 parts of silicone elastomer consisting essentially of silphenylene-siloxane monomer moieties and having a value of Mw in the range of 30,000 to 800,000,
   5 to 10 parts chlorowax,
   7 to 16 parts of at least one of ammonium dihydrogen phosphate and ammonium polyphosphate,
   9 to 17 parts of at least one of hydrated aluminum oxide and hydrated magnesium oxide,
   3 to 10 parts of a char former selected from the group consisting of carbohydrates and polyhydric alcohols,
   0 to 5 parts antimony oxide,
   5 to 10 parts of a filler selected from the group consisting of glass fibers and mica particles, and
   an anti-oxidant for said polymeric composition.

7. A moldable mixture as recited in claim 6 in which said monomer moiety comprises 1,4-phenylene-hexa (R) trisiloxanyl, where R represents up to two phenyl groups, a vinyl group or methyl, ethyl, propyl, or isopropyl groups.

8. A moldable mixture as recited in claim 6 in which said monomer moiety comprises 1,4-phenylene-hexa (R) trisiloxanyl, where R represents up to two phenyl groups, a vinyl group or methyl, ethyl, propyl, or isopropyl groups or fluorinated analogs of such alkyl groups.

9. A moldable mixture as recited in claim 6 in which said monomer moiety comprises 1,4-phenylene-1,1,3,5,5-penta (R)-3 vinyl trisiloxanyl, where R represents up to two phenyl groups or methyl, ethyl, propyl, or isopropyl groups or fluorinated analogs of such alkyl groups.

10. A moldable mixture as recited in any of claims 6 through 9 comprising 2 to 5% by weight antimony oxide.

* * * * *